United States Patent
Apte et al.

(10) Patent No.: US 8,537,676 B1
(45) Date of Patent: Sep. 17, 2013

(54) RATE LIMITING FOR DTCP MESSAGE TRANSPORT

(75) Inventors: Manoj Apte, San Jose, CA (US); Senthil Kumar Duraiswamy, Tamil Nadu (IN)

(73) Assignee: Juniper Networks, Inc., Sunnyvale, CA (US)

(*) Notice: Subject to any disclaimer, the term of this patent is extended or adjusted under 35 U.S.C. 154(b) by 1233 days.

(21) Appl. No.: 11/774,886

(22) Filed: Jul. 9, 2007

(51) Int. Cl.
*H04L 12/26* (2006.01)

(52) U.S. Cl.
USPC .......................................................... 370/232

(58) Field of Classification Search
USPC .......................................................... 370/232
See application file for complete search history.

(56) References Cited

U.S. PATENT DOCUMENTS

| | | | |
|---|---|---|---|
| 2002/0122427 A1* | 9/2002 | Kamentsky et al. | 370/395.4 |
| 2004/0193714 A1* | 9/2004 | Bowman et al. | 709/227 |
| 2005/0030953 A1* | 2/2005 | Vasudevan et al. | 370/395.4 |
| 2005/0165917 A1* | 7/2005 | Le et al. | 709/220 |
| 2005/0232272 A1* | 10/2005 | Deng | 370/390 |
| 2005/0262560 A1* | 11/2005 | Gassoway | 726/22 |
| 2007/0124816 A1* | 5/2007 | Abigail | 726/24 |
| 2007/0124822 A1* | 5/2007 | Liu | 726/32 |
| 2007/0143490 A1* | 6/2007 | Gallou et al. | 709/231 |

FOREIGN PATENT DOCUMENTS

WO    PCT/EP04/50566    * 10/2004

OTHER PUBLICATIONS

Cavuto, D.; Rexroad, C.B.; Apte, M.; Jain,S.—DTCP: Dynamic Tasking Control Protocol—Nov. 2005—IETF.*

* cited by examiner

*Primary Examiner* — Mark Rinehart
*Assistant Examiner* — Christopher R Crompton
(74) *Attorney, Agent, or Firm* — Harrity & Harrity, LLP

(57) ABSTRACT

A network device may limit the rate at which control messages are forwarded to a destination device when forwarding traffic pursuant to dynamic flow capture (DFC). In one implementation, a system may receive filtering criteria associated with DFC of network traffic and passively filter incoming traffic based on the filtering criteria to obtain traffic that matches the filtering criteria. The system may transmit a rate limited version of control messages associated with the filtered traffic to a control device.

26 Claims, 6 Drawing Sheets

RATE LIMITING FOR DTCP MESSAGE TRANSPORT

BACKGROUND OF THE INVENTION

A. Field of the Invention

The principles described herein relate generally to network traffic monitoring and, more particularly, to systems and methods that provide dynamic flow capture of network traffic.

B. Description of Related Art

Network devices, such as routers, receive data on physical media, such as optical fiber, analyze the data to determine its destination, and output the data on physical media in accordance with the destination. In a high traffic public network, such as the Internet, the routers that make up the network may be owned and operated by a number of different entities. An Internet Service Provider (ISP), for example, may operate a number of routers. The ISP may sell access to the network to end-users, such as consumers or businesses.

ISPs may desire or need to monitor traffic from certain ones of its customers. In some jurisdictions, the law may require that the ISP have the ability to monitor its traffic.

Passive traffic monitoring techniques are known by which the ISP (or other entity that controls a router) may set up filtering criteria within the router. When data matches the filtering criteria, a copy of the data is forwarded to one or more destinations. For example, a filter may be set up that specifies that all packets from a particular IP address be forwarded to a designated destination.

SUMMARY

One aspect is directed to a network device that may include logic to store filtering criteria that defines conditions by which network traffic is to be forwarded to a first destination device; logic to forward, to a second destination device, control messages relating to the network traffic that is forwarded to the first destination device; and logic to limit the maximum rate at which the forwarded control message are forwarded to the second destination device.

Another aspect is directed to a method that may include receiving filtering criteria associated with dynamic flow capture (DFC) of network traffic; passively filtering incoming traffic based on the filtering criteria to obtain traffic that matches the filtering criteria; transmitting the traffic that matches the filtering criteria to a first destination device; and transmitting a rate limited version of control messages associated with the DFC of the network traffic to a second destination device, the rate limited version of the control messages for the second destination device being performed on a per-destination device basis.

Another aspect is directed to a router device that may include a first physical interface card (PIC) configured to provide a physical interface to a network and a second PIC configured to monitor traffic received by the first PIC from the network. The router device may further include logic to store filtering criteria that defines conditions by which the monitored traffic is to be forwarded to a destination device and logic to limit a maximum rate at which control messages associated with the forwarded traffic are transmitted to a second destination device

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, network devices, such as routers, passively capture and forward traffic that meets filtering criteria to destination devices. The network devices may also forward control messages related to the filtering. The network devices may limit the rate at which the control messages are forwarded to a particular destination control device. The rate may be limited and/or determined on a per-destination basis. By limiting the rate at which a particular destination control device receives the control messages, overloading of the destination control devices may be avoided.

Exemplary System Overview

Figure 1:
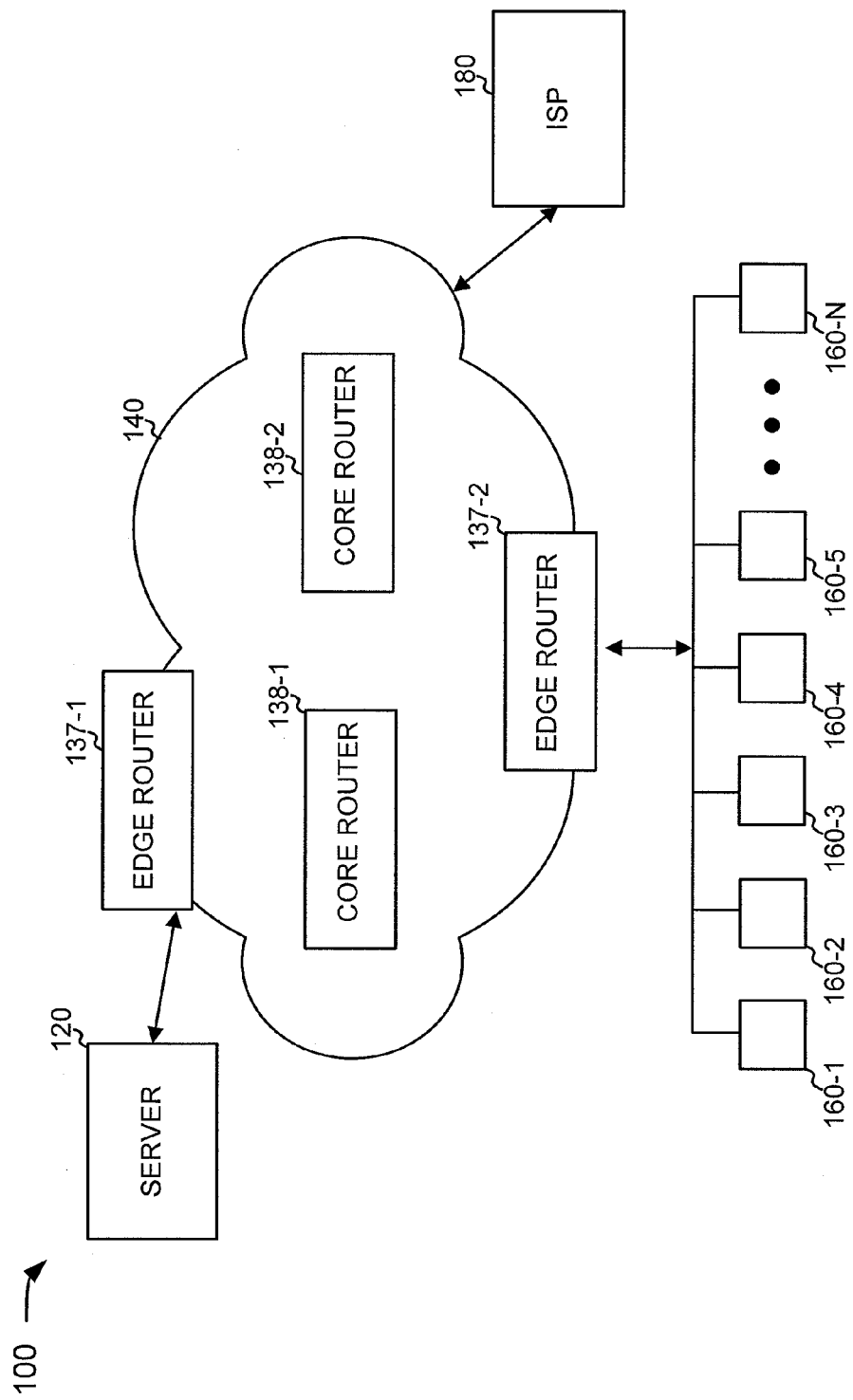
FIG. 1 is a diagram of an exemplary system in which concepts described herein may be implemented.

FIG. 1 is a diagram of an exemplary system 100 in which concepts described herein may be implemented. System 100 may include multiple entities, such as a server 120, a network 140, end-users 160-1 through 160-N (collectively referred to herein as end-users 160), and an Internet Service Provider (ISP) 180. Server 120 may include one or more computing devices designed to provide information or to otherwise interact with end-users 160. Similarly, end-users 160 may each include one or more computing devices designed to interact with and obtain content from server 120. End-users 160 may communicate with other end-users 160 and with server 120 via network 140.

Network 140 may comprise a wide area network (WAN), such as the Internet, a private WAN, a telephone network, such as the Public Switched Telephone Network (PSTN), or a combination of networks. Network 140 may include a number of routers or other switching devices, such as edge routers 137-1 and 137-2 (collectively referred to as edge routers 137), and core routers 138-1 and 138-2 (collectively referred to as core routers 138).

Edge routers 137 may generally function to connect devices, such as end-users 160 to network 140. In some implementations, multiple end-users 160 may first connect to an intermediate access device which may connect them to an edge router 137. Core routers 138 may generally function to transmit data between other routers within network 140. In addition to simply routing data, edge routers 137 and core routers 138 may support other "value added" functions, such as quality of service (QoS) features, specialized security functions, traffic accounting features, or traffic flow capture functions. In particular, regarding traffic flow capture, edge routers 137 and/or core routers 138 may implement dynamic flow capture (DFC) through which an administrator of the router (e.g., an ISP) can capture and forward traffic flows on the basis of dynamic filtering criteria. DFC will be discussed in more detail below.

ISP 180 may provide access to network 140 or portions of network 140 for server 120 and end-users 160. ISP 180 may, for instance, own or manage routers, such as edge routers 137 and core routers 138 in network 140. In some situations, such as when network 140 is the Internet, ISP 180 may control only a portion of the routers and connections in network 140. In this situation, ISP 180 may, for example, participate in peering arrangements with other ISPs or other entities in which ISP 180 may send traffic to and receive traffic from routers or other network equipment owned by other ISPs.

One of ordinary skill in the art will appreciate that, in practice, system 100 may include other network devices. Additionally, although one server 120, one ISP 180, two-edge routers 137, and two core routers 138 are shown in FIG. 1, it can be appreciated that system 100 may have more or fewer servers, ISPs, edge-routers, or core routers. In still other implementations, one or more components of system 100 may perform one or more of the tasks described as being performed by one or more other components of system 100.

Exemplary Network Device Architecture

Figure 2:
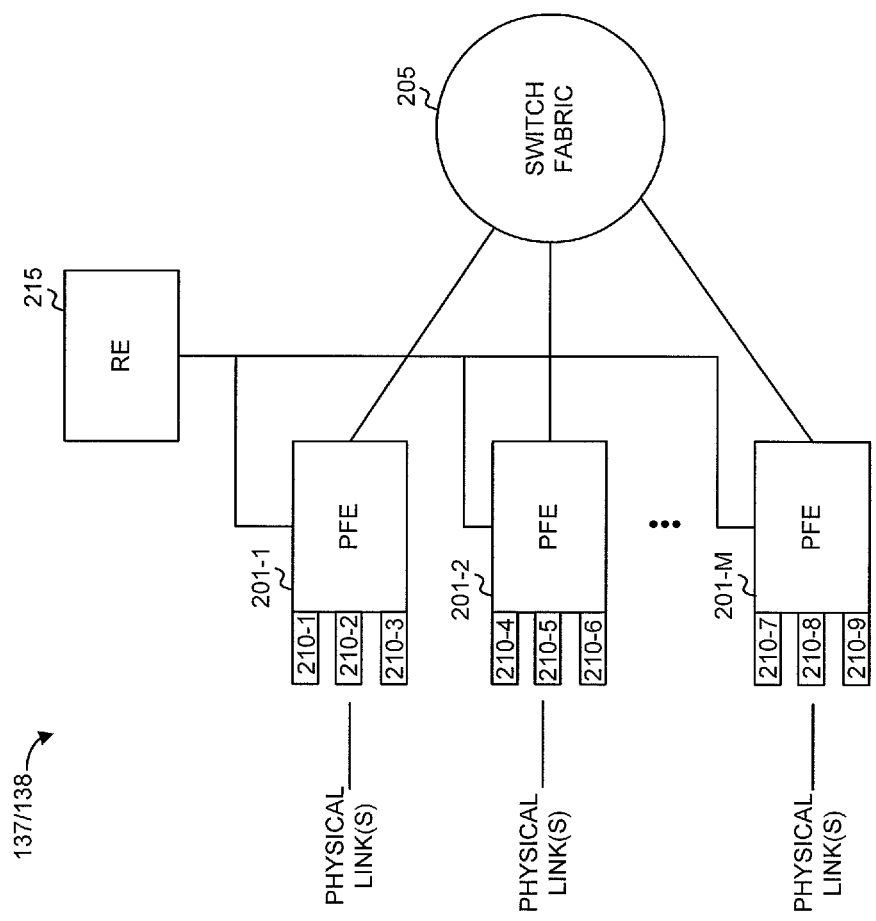
FIG. 2 is a block diagram illustrating a high-level exemplary implementation of one of the edge routers or core routers shown in FIG. 1.

FIG. 2 is a block diagram illustrating a high-level exemplary implementation of one of edge routers 137 or core routers 138, referred to as router 137/138. Router 137/138 may include packet forwarding engines (PFEs) 201-1 through 201-M (collectively referred to as PFEs 201), an internal switch fabric 205, and a routing engine (RE) 215. Router 137/138 may receive data from physical links, process the data to determine destination information, and transmit the data out on a link in accordance with the destination information.

RE 215 may perform high level management functions for router 137/138. For example, RE 215 may communicate with other networks and systems connected to router 137/138 to exchange information regarding network topology. RE 215 may create routing tables based on the network topology information and forward the routing tables to PFEs 201. PFEs 201 may use the routing tables to perform route lookup for incoming data. RE 215 may also perform other general control and monitoring functions for router 137/138.

PFEs 201 may each connect to RE 215 via switch fabric 205. Switch fabric 205 provides internal links between different PFEs 201 and RE 215. In general, PFEs 201 receive data on ports connecting physical links that lead to network 140. Each physical link could be one of many types of transport media, such as optical fiber or Ethernet cable. The data on the physical link may be formatted according to one of several protocols, such as the synchronous optical network (SONET) standard. PFEs 201 process the received data, determine the correct output port for the data, and transmit the data on the physical link corresponding to the determined output port.

Each PFE 201 may be associated with one or more physical interface cards (PICs) 210-1 through 210-9 (referred to collectively as PICs 210). PICs 210 may provide low-level interfaces for the PFEs to the physical links. PICs 210 may receive and transmit packets from the physical links. PICs 210 may include media-specific logic that performs, for example, framing and checksum verification. Different types of PICs 210 may operate according to different transmission rates or physical media types, such as OC-192 and OC-48 transmission rates, and protocols or standards, such as the Synchronous Optical Networking (SONET) standard for data transmission over optical networks. PICs 210 may be "pluggable" in the sense that PICs may be removed or added to PFEs 201 as needed.

At least one of PICs 210, such as PIC 210-9, may be a special purpose PIC designed to implement DFC. PIC 210-9 may be a DFC PIC that is designed to monitor traffic received at one or more of the other PICs 210. For example, a traffic flow received at PIC 210-1 may be forwarded to PIC 210-9. At PIC 210-9, packets in the traffic flow may be compared to filtering criteria, and packets that match the criteria may be forwarded to a specified destination device, such as a computing device at ISP 180. The traffic monitoring operation of PIC 210-9 may be passive, meaning that monitored traffic is still forwarded on the way to its original destination.

Exemplary Computing Device Architecture

Figure 3:
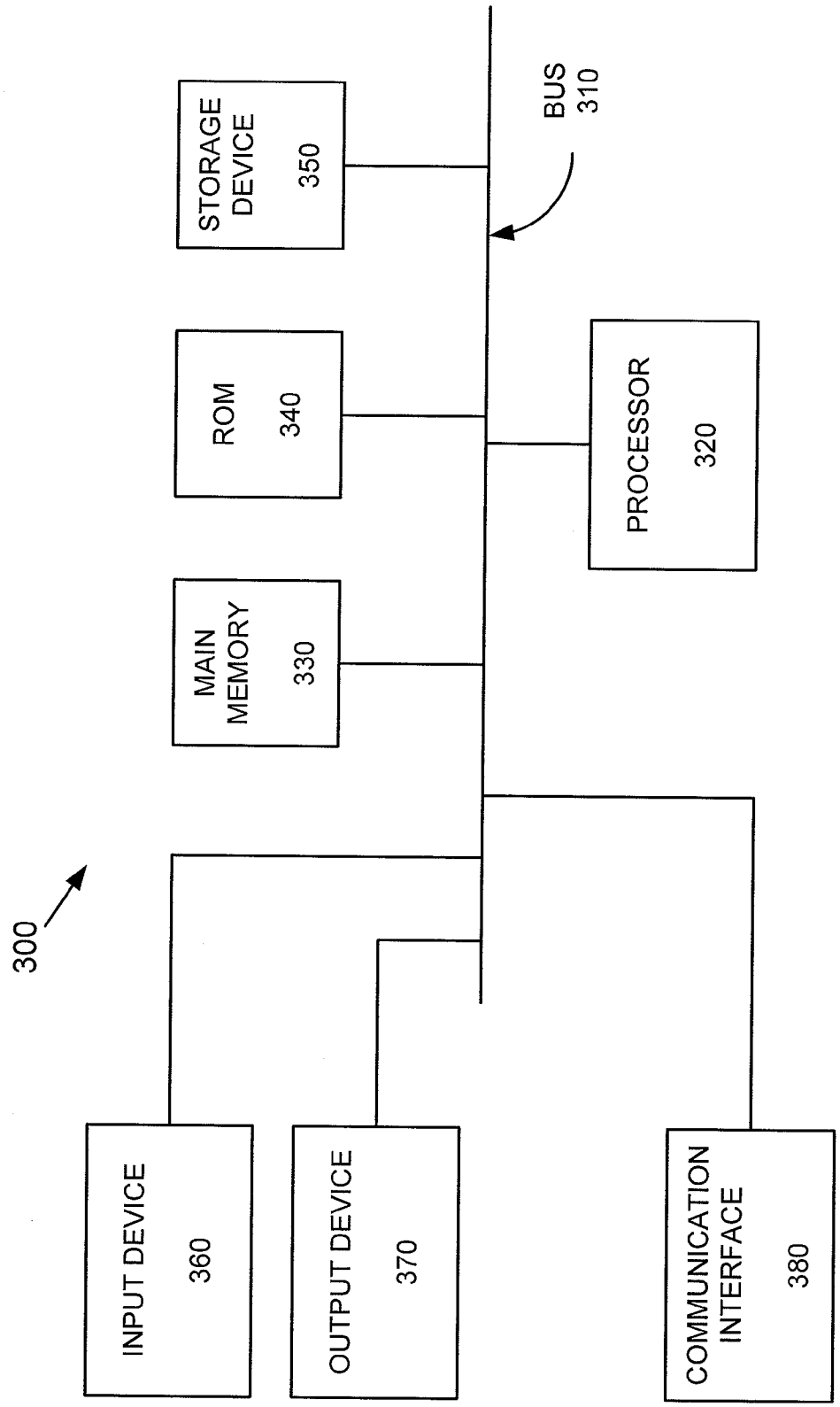
FIG. 3 is a block diagram of an computing device shown in FIG. 1.

FIG. 3 is a block diagram of an exemplary computing device 300, which may correspond to server 120, a computing device associated with end-user 160, or a computing device associated with ISP 180 (not shown in FIG. 1). Device 300 may include a bus 310, a processor 320, a main memory 330, a read only memory (ROM) 340, a storage device 350, an input device 360, an output device 370, and a communication interface 380. Bus 310 may include a path that permits communication among the elements of the device.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the device, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the device to communicate with other devices and/or systems.

Device 300 may perform operations in response to processor 320 executing software instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles described herein. Thus, implementations described herein are not limited to any specific combination of hardware circuitry and software.

Dynamic Flow Capture

Figure 4:
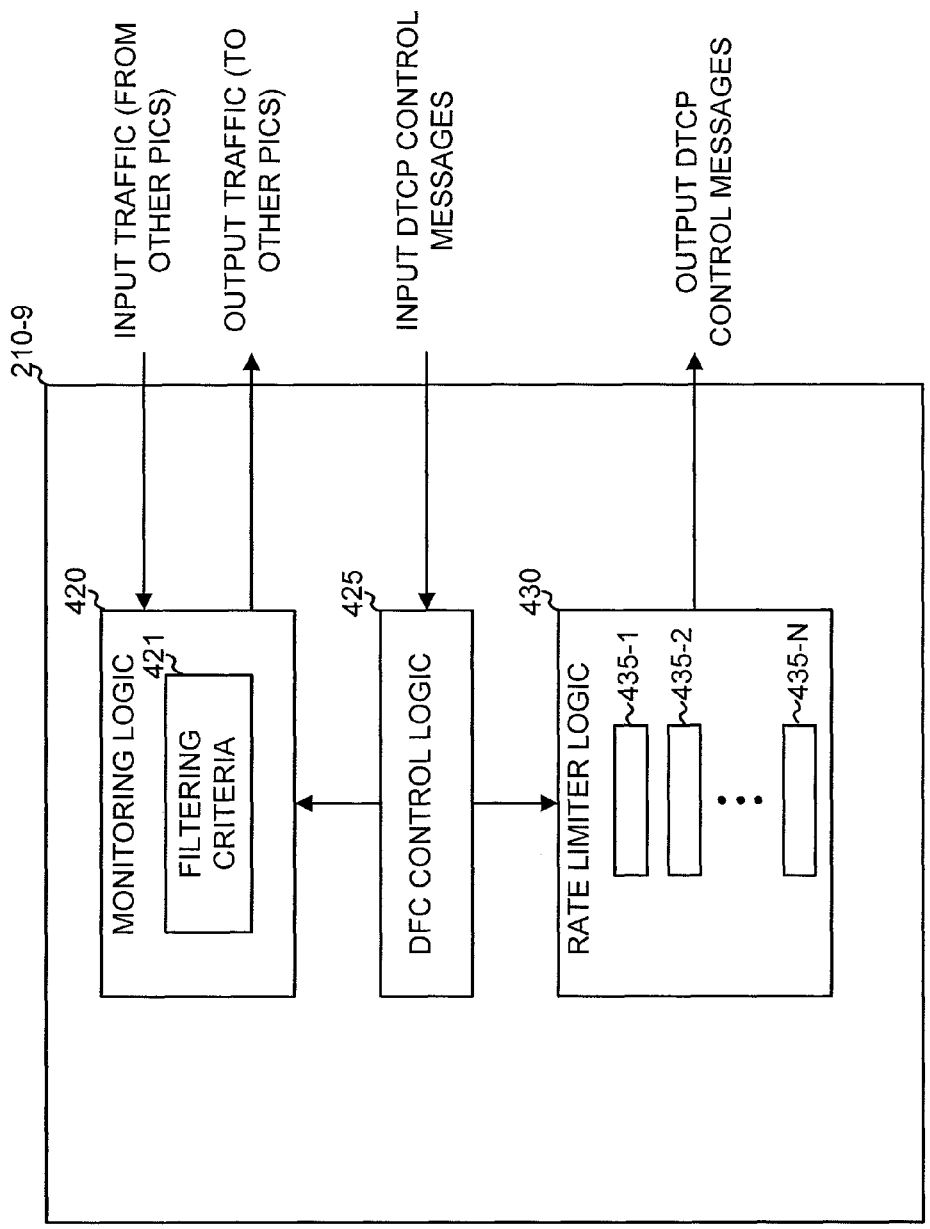
FIG. 4 is a diagram illustrating exemplary components of a dynamic flow control (DFC) physical interface card (PIC)

As previously mentioned, one of PICs 210, such as PIC 210-9, may be a special purpose PIC designed to implement DFC. FIG. 4 is a diagram illustrating exemplary components of a DFC PIC in additional detail. DFC PIC 210-9 may include monitor logic 420, DFC control logic 425, and rate limiter logic 430.

Monitor logic 420 may store filtering criteria 421 from one or more control devices, where each filter criterion may define conditions by which traffic is to forwarded to a destination device. For example, a filter criterion may specify that any packets from a certain IP address and using the ftp (file transfer protocol) are to be forwarded to the destination device.

Monitor logic 420 may monitor input traffic, based on filtering criteria 421, to determine whether packets within the input traffic match the filtering criteria. Packets that match the filtering criteria may be transmitted from DFC PIC 210-9 to a predetermined destination. The destination device may be, for example, an archiving server that is specified by a control device.

DFC control logic 425 may receive input Dynamic Tasking Control Protocol (DTCP) control messages from a control device. DTCP is a known message-based interface by which an authorized client may connect to a server, such as a router. DTCP allows for multiple clients to simultaneously control a single device. The DTCP control messages may be sent over UDP (User Datagram Protocol).

The DTCP control messages received by DFC control logic 425 may include messages from authorized control devices that setup, modify, or stop DFC sessions. The DTCP control messages may also include messages that request statistics or other information relating to a DFC session.

A DTCP control message may, for example, include filter criterion 421 for monitoring logic 420. In this situation, DFC control logic 425 may update filtering criteria 421 to reflect the contents of the DTCP control message.

Rate limiter logic 430 may operate to limit the rate at which DTCP control messages are transmitted to destination devices. Because the output DTCP control messages may normally be sent at the maximum output rate of an I/O PIC (called "line rate"), it is possible that the output DTCP control messages may have a relatively high bandwidth. In contrast, the control device that receives the DTCP control messages for a particular DFC session (e.g., a particular filter criterion) may have a much lower input capacity. Accordingly, forwarding DTCP control message traffic at line rate may, in some situations, overwhelm the destination device.

In one implementation, rate limiter logic 430 may include a number of buffers 435-1 through 453-N (collectively buffers 435). Buffers 435 may be implemented using, for example, dedicated registers or physical memories for each buffer 435 or, alternatively, as logical queues within a single physical memory. Buffers 435 may be implemented on a per-destination control device basis. In other words, each buffer 435 may correspond to one control destination device and input messages from DFC control logic 425 that is associated with the control destination device may be queued into that buffer. Each buffer 435 may be a first-in-first-out (FIFO) queue.

Rate limiter logic 430 may use buffers 435 to limit the maximum rate at which messages are transmitted to each destination device. If, for instance, a burst of data is output by DFC control logic 425 that is above a threshold rate for the corresponding destination device, rate limiter logic 430 may temporarily store the additional traffic in one of buffers 435. In this manner, rate limiter logic 430 may limit the maximum rate at which traffic is transmitted to any particular destination device.

The threshold rate used by rate limiter logic 430 may be determined based on the goal of ensuring that the destination devices will be able to handle the incoming traffic. In one implementation, the threshold rate used by rate limiter logic 430 may be determined on a per-destination basis. In other implementations, rate limiter logic 430 may use a single threshold rate for all destination devices. The threshold rate may be determined based on information that is known or assumed about a destination device. For example, if the destination device is a personal computer or workstation, the threshold rate may be determined based on the socket buffer size of the destination device, the speed of the processor of the destination device, or other parameters that are indicative of the capacity of the destination device to service incoming traffic. Heuristics-based techniques may be used to estimate the threshold rate. In an alternative implementation, the threshold rate may be determined through a trial and error based process.

Figure 5:
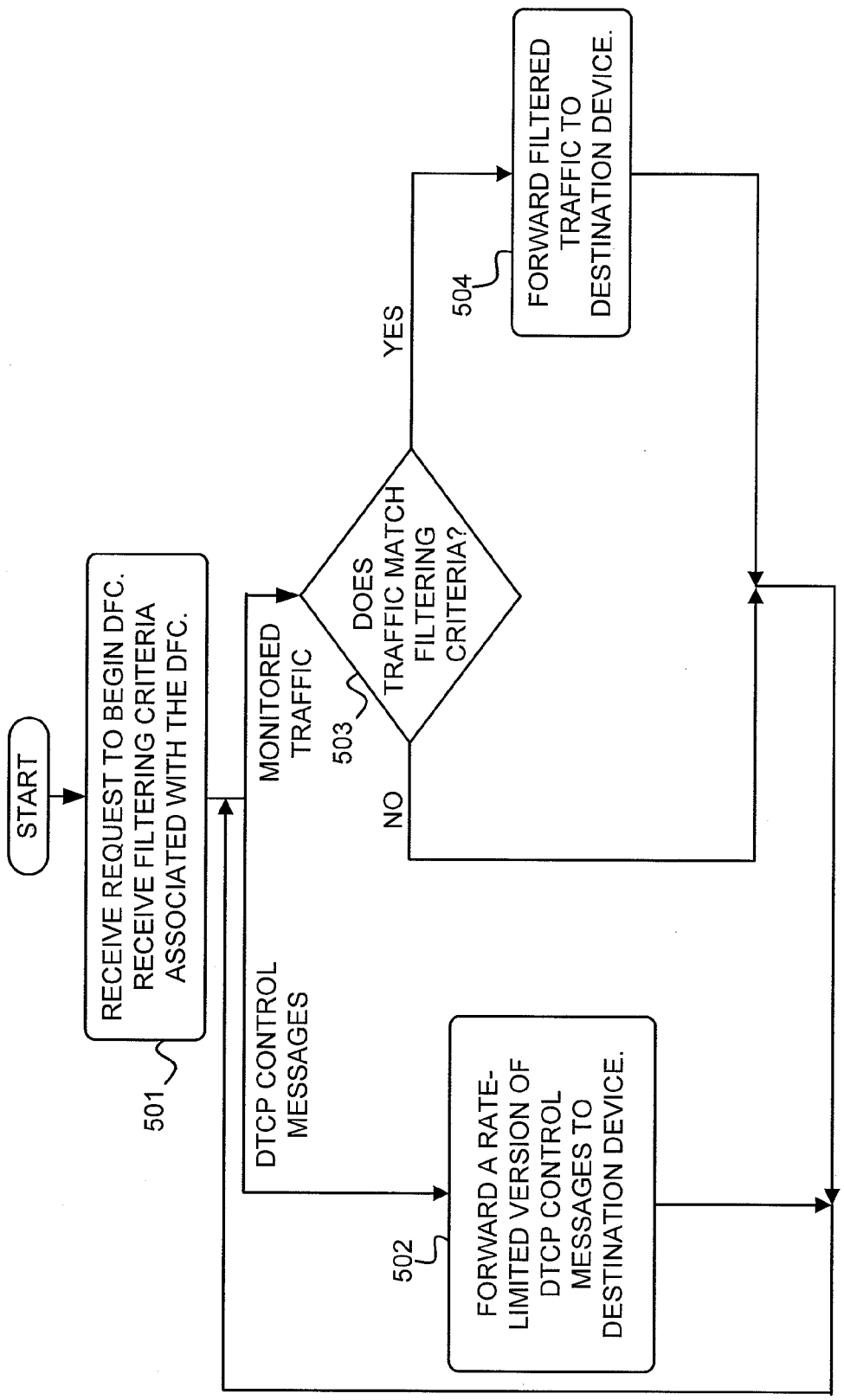
FIG. 5 is a flow chart illustrating exemplary operations that may be performed by a network device.

FIG. 5 is a flow chart illustrating exemplary operations that may be performed by a network device. The operations of FIG. 5 will be particularly illustrated with reference to FIG. 6, which is a diagram conceptually illustrating an example of the interaction of elements of system 100 consistent with the operations shown in FIG. 5.

A request to establish dynamic flow capture may be initially received by, for example, DFC PIC 210-9 (act 501). The request may be associated with DFC filtering criteria (act 501). The request may be received by DFC control logic 425 as a DTCP control message.

Figure 6:
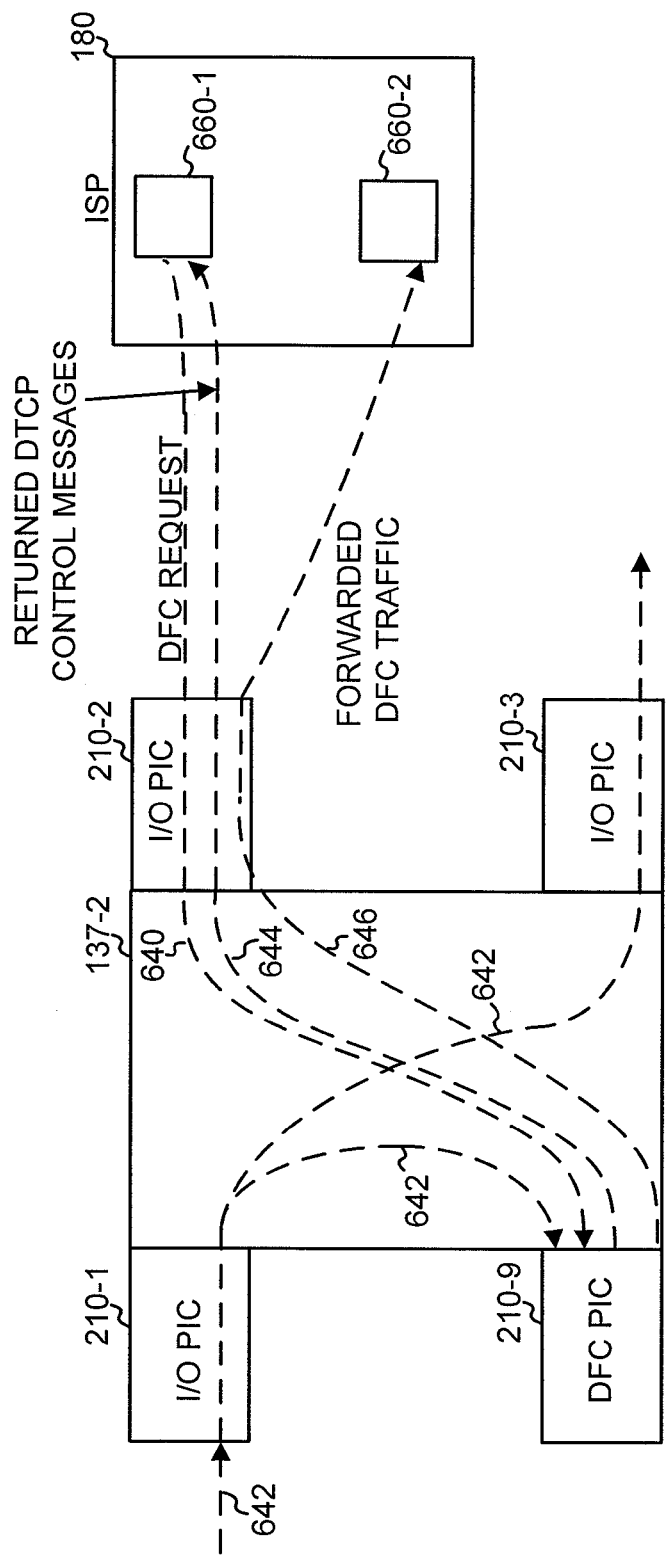
FIG. 6 is a diagram conceptually illustrating an example of the interaction of elements of the system shown in FIG. 1 consistent with the operations shown in FIG. 5.

In FIG. 6, the network device performing dynamic flow capture will be assumed to be edge router 137-2, although it can be appreciated that dynamic flow capture consistent with aspects described herein may be implemented on other routers or other network devices. Router 137-2 may include DFC PIC 210-9. In this example, three other PICs (PICs 210-1, 210-2, and 210-3) are shown as associated with router 137-2. Each of PICs 210-1 through 210-3 may be input/output (I/O) PICs designed to receive and forward data from physical links. DFC PIC 210-9 may not directly communicate with external physical links. Instead, DFC PIC 210-9 may receive packets that were originally received by I/O PICs 210-1 through 210-3, process the packets, and forward the packets back through router 137-2 to one or more of I/O PICs 210-1 through 210-3.

As shown in the example of FIG. 6, a request 640 is sent by an administrator at ISP 180, such as by a user working at a computing device 660-1 (e.g., a personal computer). Request 640 may be sent to DFC control logic 425 as a message using DTCP and may be a request to begin dynamic flow capture for a particular packet flow or set of packet flows. Request 640 may include filtering criteria and an indication of a destination device to which packets that match the filter criteria are forwarded. The destination device may be a relatively high capacity destination server. In this example, assume that the destination device is device 660-2 and the filter criteria specifies that any packets from a certain IP address and using the ftp (file transfer protocol) are to be forwarded to the destination device.

Referring back to FIG. 5, received traffic that corresponds to traffic being monitored may be forwarded to the DFC PIC (FIG. 5, "Monitored Traffic"). At the DFC PIC, monitor logic 420 may compare the traffic to filtering criteria 421 to determine whether the traffic is traffic that should be forwarded to the designated destination device. If the traffic matches the filtering criteria, (act 503), the matching traffic may be sent to the corresponding destination device (e.g., a high capacity server) (act 504).

The control messages may be DTCP control messages. In addition to the traffic forwarded by monitor logic 420, DFC PIC 210-9 may generate the output control messages. As shown in FIG. 6, these DTCP control messages may be sent to the computing device that initiated the DFC session, such as computing device 660-1. In some implementations, the computing device that initiates a DFC session may specificy that a different computing device receive the subsequent DTCP control messages for the session.

As an example of control messages sent to a control device, DFC control logic 425 may send statistics relating to a DFC session and that are requested by the control device. Since the control messages are typically sent as DTCP control messages over UDP (a non-guaranteed delivery message protocol), if the bandwidth to the control device is too high, the control messages may get dropped, thus giving an inaccurate picture to the control device. Other types of control messages may include notifications to the control devices. With this type of control information it may also be important that the bandwidth of the control messages do not overwhelm the control device.

A rate-limited version of the DTCP control messages may be forwarded to the specified computing device (act 502). As described above, the rate limiting may be performed by rate-limiter logic 430.

Returning to the example of FIG. 6, a traffic flow that is being monitored is illustrated by curves 642. Assume that a user initiating at least some of this traffic is suspected of illegal activity and ISP 180 was instructed by a law enforcement agency to monitor this traffic. Traffic 642 is received by I/O PIC 210-1 and may be forwarded as normal through edge router 137-2 to I/O PIC 210-3. As shown, a copy of traffic 642 is also sent to DFC PIC 210-9. DFC PIC 210-9 may apply the filtering criteria defined for this traffic flow. The portions of the traffic flow that match the filtering criteria are then forwarded to destination device 660-2 as traffic 644. DTCP control messages relating to this DFC session may be sent to destination device 660-1. The control messages may be rate limited by rate limiter logic 430 to a bandwidth appropriate for destination device 660-1. For example, destination device 660-1 may be a personal computer or workstation with limited capacity to service incoming traffic. Rate limiter logic 430 may ensure that destination device 660-1 is able to handle the control messages sent to it. This is particularly useful with DTCP control messages that use UDP for communication. Because message delivery via UDP is not guaranteed, the high potential bandwidth via which DFC PIC 210-9 may transmit control messages to destination device 660-1 may cause destination device 660-1 to potentially drop control messages that contain needed information. The per-device rate control implemented by rate limiter logic 430 of DFC PIC 210-9, as described herein, can advantageously mitigate this issue to thus provide the information in a more controlled manner.

CONCLUSION

As described above, by rate limiting the output of control messages relating to a DFC session, the device receiving the control messages may be able to better handle high-bandwidth traffic bursts that would otherwise be forwarded to the device. This can be particularly important when the device has a limited capacity to handle traffic bursts (such as when the destination device is a personal computer) or is connected to the network via a connection with relatively limited bandwidth.

Although, in the above disclosure, routers were primarily described as performing DFC, one of ordinary skill in the art will appreciate that other network devices could perform this function. Further, although rate limiting was described above as being done on a per-destination device basis, the rate limit can be done on the basis of other physical or logical entities, such as an IP address or device associated with the control source for DFC requests (e.g., device 660-1 in the example of FIG. 6).

The foregoing description of exemplary embodiments provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device comprising:
a first processor to:
receive, from a remote device, a request to initiate filtering of network traffic,
the request including information identifying a first destination device and a second destination device, and
the remote device being different from the second destination device;
receive the network traffic intended for an original destination;
determine whether the network traffic matches filtering criteria that defines conditions by which the network traffic is to be forwarded to the first destination device, the first destination device being different from the original destination;
forward the network traffic to the first destination device when the network traffic matches the filtering criteria;

forward, to the second destination device, control messages relating to the network traffic that is forwarded, based on the filtering criteria, to the first destination device,
the second destination device being different from the first destination device and the original destination, and
the second destination device including a second processor;
determine a threshold rate based on a speed of the second processor of the second destination device; and
limit, based on the threshold rate, a maximum rate at which the control messages are forwarded to the second destination device.

2. The network device of claim 1, where, when limiting the maximum rate, the first processor is further to:
limit the maximum rate on a per-destination device basis.

3. The network device of claim 1, where, when limiting the maximum rate, the first processor is further to:
queue traffic for the second destination device in a plurality of buffers of the network device.

4. The network device of claim 1, where the first processor is further to:
receive a second request from a remote user, and
modify the filtering criteria based on the second request.

5. The network device of claim 4, where the request is a Dynamic Tasking Control Protocol (DTCP) message.

6. The network device of claim 1, where the first processor uses a special purpose physical interface card to determine whether the network traffic matches the filtering criteria.

7. The network device of claim 1, where, when limiting the maximum rate, the first processor is further to:
queue the control messages in a plurality of buffers that store other control messages.

8. The network device of claim 1, where the second destination device includes a personal computer or workstation associated with an end-user.

9. The network device of claim 1, where the first destination device is not associated with a source of the network traffic.

10. The network device of claim 1, where, when forwarding the control messages, the first processor is further to:
transmit the control messages to the second destination device as Dynamic Tasking Control Protocol (DTCP) messages sent over User Datagram Protocol (UDP).

11. The network device of claim 1, where the network traffic matches the filtering criteria when the network traffic is from a particular Internet protocol (IP) address and is using a particular file transfer protocol.

12. A method comprising:
receiving, by a first device, a request from a second device that initiates dynamic flow capture (DFC) of traffic,
the request including filtering criteria and information identifying a first destination device and a second destination device, and
the second device being different from the second destination device;
determining that the traffic matches the filtering criteria;
transmitting a copy of the traffic to the first destination device when the traffic matches the filtering criteria;
determining, by the first device, a threshold rate based on a speed of a processor of the second destination device; and
transmitting, based on the threshold rate, control messages associated with the DFC of the traffic to the second destination device.

13. The method of claim 12, where determining the threshold rate comprises:
determining the threshold rate based on the speed of the processor of the second destination device and a socket buffer size of the second destination device.

14. The method of claim 12, where the first destination device is not associated with an original source or an original destination of the traffic.

15. The method of claim 12, where receiving the request comprises:
receiving one or more Dynamic Tasking Control Protocol (DTCP) messages that include the filtering criteria.

16. The method of claim 12, where transmitting the control messages comprises:
transmitting the control messages as Dynamic Tasking Control Protocol (DTCP) messages.

17. The method of claim 12, where determining whether the traffic matches the filtering criteria comprises:
determining that the traffic matches the filtering criteria when the network traffic is from a particular Internet protocol (IP) address.

18. A system comprising:
a first device to:
receive a request from a second device that initiates filtering of traffic,
the request including filtering criteria and information identifying a first destination device and a second destination device, and
the second device being different from the second destination device;
receive the traffic intended for a destination device;
determine that the traffic matches the filtering criteria;
forward the traffic to the first destination device after determining that the traffic matches the filtering criteria,
the first destination device being different from the destination device;
generate control messages related to the traffic that is forwarded based on the filtering criteria;
determine a threshold rate based on a speed of a processor of the second destination device; and
transmit, based on the threshold rate, a rate limited version of the control messages to the second destination device.

19. The system of claim 18, where the threshold rate is determined on a per-destination device basis.

20. The system of claim 18, where the network traffic matches the filtering criteria when the network traffic is using a particular file transfer protocol.

21. A device comprising:
a first physical interface card (PIC) to receive traffic; and
a second PIC to:
receive a request from a computing device that initiates filtering of the traffic,
the request including information identifying a first destination device and a second destination device, and
the computing device being different from the second destination device,
determine that the traffic matches filtering criteria that defines conditions by which the traffic is to be forwarded to the first destination device,
forward the traffic to the first destination device after determining that the traffic matches the filtering criteria,
determine a threshold rate based on a speed of a processor of the second destination device, and send control messages, at a rate that is based on the threshold rate, associated with the forwarded traffic, to the second destination device.

22. The device of claim 21, where the filtering criteria is for a plurality of destination devices, and where the plurality of destination devices comprise the second destination device.

23. The device of claim 21, further comprising:
a plurality of PICs to provide physical interfaces to a network,
where the plurality of PICs include the first PIC and the second PIC.

24. The device of claim 21, further comprising:
a processor to determine destination information for the traffic,
where the traffic matches the filtering criteria when the destination information matches a particular address.

25. The device of claim 21, where the second PIC is further to:
forward the control messages as Dynamic Tasking Control Protocol (DTCP) messages over User Datagram Protocol (UDP).

26. The device of claim 21, where, when limiting the maximum rate, the second PIC is to:
limit the maximum rate on a per-destination device basis.

* * * * *